Nov. 14, 1961  A. C. KEATHLEY ET AL  3,008,417
MODULAR CONSTRUCTION OF SOLID ROCKET FUEL CHARGES
Filed Sept. 14, 1959  3 Sheets-Sheet 1
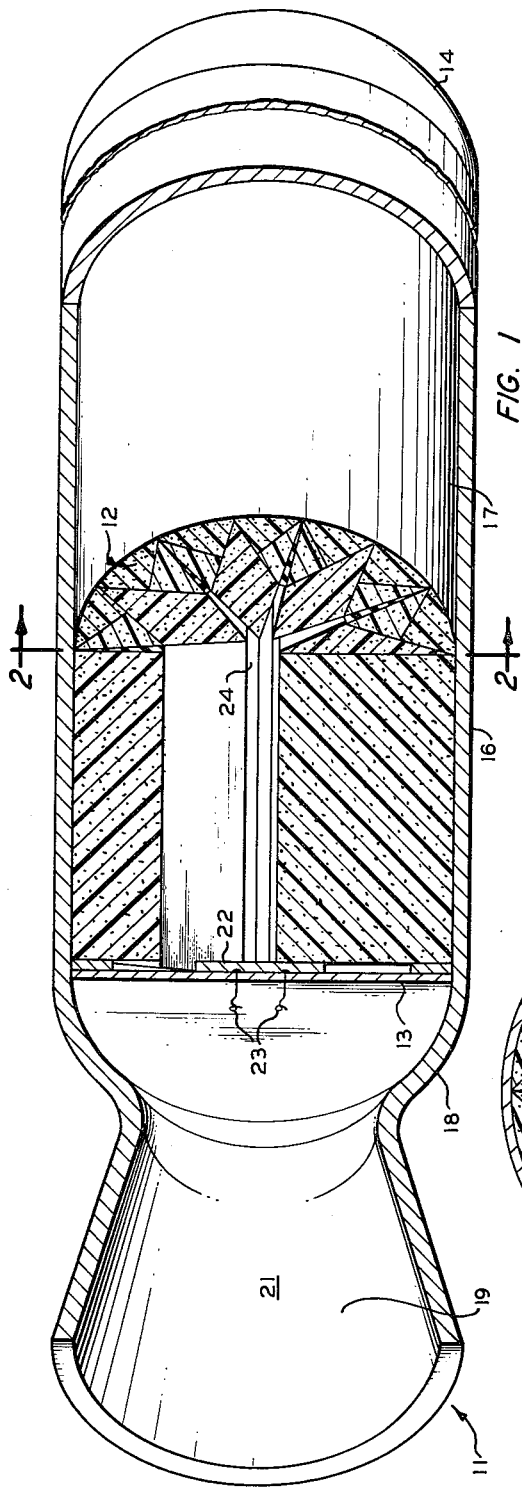
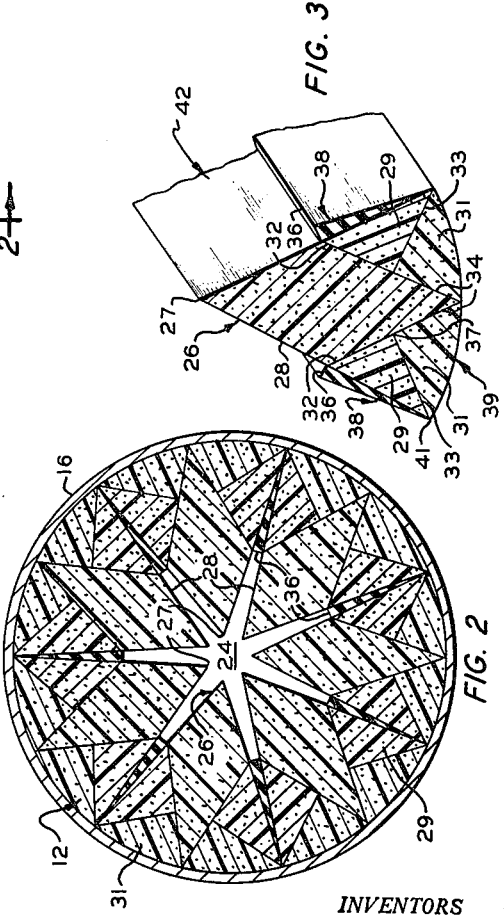
INVENTORS
A.C. KEATHLEY
R.E. ALLENSON
BY
Hudson & Young
ATTORNEYS United States Patent Office 3,008,417
Patented Nov. 14, 1961

3,008,417
MODULAR CONSTRUCTION OF SOLID
ROCKET FUEL CHARGES
Anthony C. Keathley, Beverly Hills, Calif., and Ray E. Allenson, Los Alamos, N. Mex., assignors to Phillips Petroleum Company, a corporation of Delaware
Filed Sept. 14, 1959, Ser. No. 839,975
10 Claims. (Cl. 102—98)

This invention relates to the geometry of the charge employed in solid propellant fueled rocket motors. In one aspect it relates to rocket apparatus. In another aspect it relates to a process of assembling such apparatus. In another aspect it relates to the design of a cylindrical propellant having an axial internal star-shaped perforation built up of shaped blocks of propellants of different burning rates, called modules. In another aspect it relates to design of such solid propellant charges so that they will burn out with substantially no sliver formation at the end of their burning.

Rocket motors utilizing solid propellant may be classified in several categories depending on their size, shape and/or configuration of the charge; and on their utility (i.e. jet-assisted take-off, booster, sustainer or missile). Each classification has specific problems relating to its requirements and specifications. The present invention generally relates to those rocket motors utilizing large sustainer propellant charges having relatively long burning durations, and most particularly, which involve scale-up problems of fabrication and assembly not generally found in the prior art.

A fundamental characteristic of solid propellants is burning in parallel layers. This property, together with change in chamber pressure as a function of burning surface, establishes one of the principal problems in the design of any solid propellant rocket; selection of a suitable geometry for the propellant charge in order to achieve a desired thrust-time program.

Charge designs whose burning surface are excessively progressive or regressive are usually not suitable for thrust-time programs. Also to be minimized, is, the formation of residual propellant, or "sliver," on the motor walls that tends to drag out the burnout of the motor— an undesirable operating condition. Generally, volumetric loading to give a charge of high density is desirable to impart high total impulse.

The prime disadvantages of the common star design are associated with the interdependence of sliver content, volumetric loading and thrust progressivity. It is not possible to obtain exceptional balance of any two of the above parameters without sacrificing, in some degree, the function of the third.

We have discovered a star design that has numerous applications where up to 95 percent volumetric loading, no sliver content, and no internal hardware are basic requirements of the desired motor. The improvements in solid propellant rocket motors that can be attained by our invention are the substantially complete elimination of sliver, with the use of only two or three burning rates, and increased freedom of thrust-time programming.

An object of this invention is to provide an improved rocket motor of the solid propellant type by the use of a new design internal star type of perforation in the cylindrical charge.

Another object is to provide a solid propellant charge which is applicable where high volumetric loading, no sliver content and no internal hardware are basic requirements of the desired motor.

Still another object of the invention is to provide a method for building charges from solid propellant sub-modules of several critical shapes to provide the desired thrust-time program.

Further objects and advantages of this invention will become apparent to those skilled in the art from a study of the accompanying disclosure, drawings, and appended claims in which:

FIGURE 1 is a longitudinal view in elevation and half section of a sustained type rocket motor having loaded therein a solid propellant charge fabricated in accordance with the present invention;

FIGURE 2 is a cross-sectional view of the rocket motor of FIGURE 1 taken along the plane 2—2;

FIGURE 3 is an isometric view of one module of FIGURE 2 including the adjoining burning restrictors.

Figure 4:
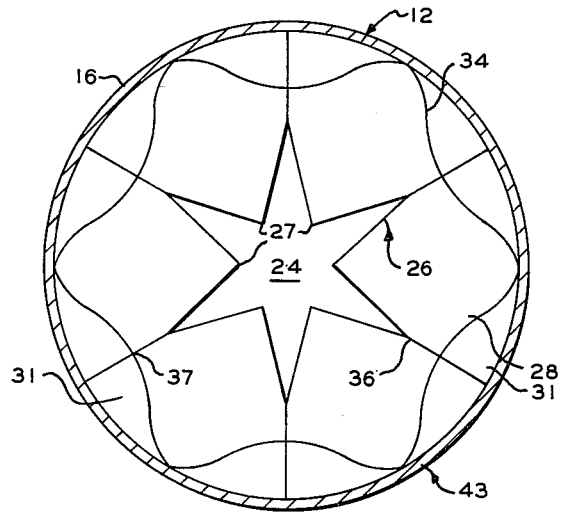
FIGURE 4 is a cross-sectional view of another embodiment of the rocket motor charge of this invention.

Referring now to the drawing and to FIGURE 1 in particular, a rocket motor generally designated 11 is shown loaded with a built up propellant charge generally designated 12, having an axial star-shaped perforation bounded on one end by an annular restrictor plate 13, which may be made of rubber or other known material. The charge is bounded on the fore end by a closure member 14 by threads, welding or the like. Casing 16 defines in part combustion chamber 17 in which charge 12 is loaded. The rear or aft end of casing 16 is tapered at 18 to a nozzle portion 19; these members are so constructed so as to define venturi-like passage 21 for the exhaust of gaseous products from combustion chamber 17. Reduced casing portion 18 can be also fitted with one or more safety plug attachments (not shown) capable of releasing excessive pressure from the combustion chamber 17 in a manner well known to those skilled in the art. Suitable ignition means such as an electrically actuated igniter 22 is secured to blow-out plate 13 in proximity to the rear end of charge 12. Electric wire means 23 are in intimate contact with the igniter composition of igniting means 22 and extend from the rocket motor 11 through the venturi passage to suitable contacts of a power source exterior to rocket motor 11. Igniter 22 can be any of the igniters commonly employed in the rocket art, for example: black powder or other pyrotechnic material contained in a suitable plastic bag or wire mesh material with suitable electro-responsive means, such as squibs or matches, embedded therein.

Figure 5:
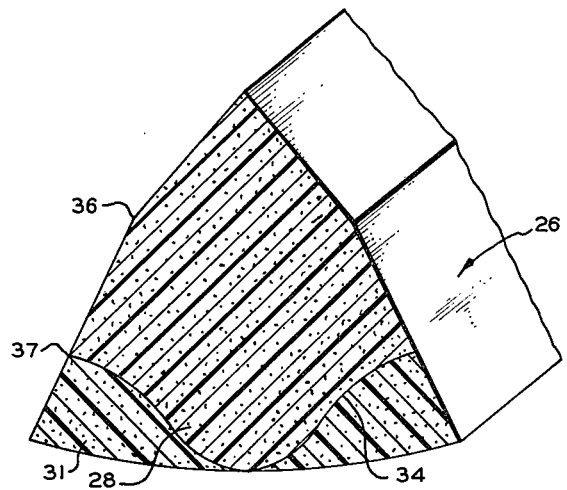
FIGURE 5 is an isometric view of one module of the rocket motor charge of FIGURE 4.
Figure 6:
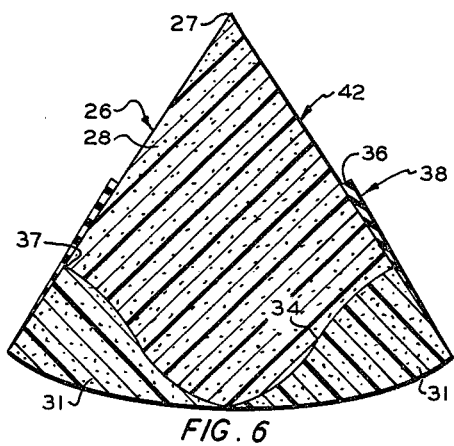
FIGURE 6 is a cross-sectional view of one module of another embodiment of this invention including burning restrictors.

Propellant charge 12 has a generally cylindrical configuration, with a star-shaped axial perforation 24 providing said charge with a plurality of internal and external star-points, said charge comprising a plurality of longitudinally extending, circumferentially contiguous propellant modules 26, clearly shown in FIGURE 2, each forming a substantially sectorial wedge of said charge disposed with the apexes of said wedges forming the internal star-points 27 of said charge. Each of said modules comprises at least a first, second, and third contiguous sub-module 28, 29, and 31, similarly longitudinally extending as shown in FIGURE 3. Interfaces between said submodules 32, 33, and 34 are defined by the locus of points described by the intersections of at least three families of concentric circles. The center of the first of said families is located generally at the internal star-point 27 of said charge which is also the apex of said first submodule, the center of the second of said families being located generally at the external star-point 36 of said charge. The center of the third of said families being located generally at the point 37 where the last submodule is first ignited. The module is bounded on both sides by a wedge-shaped burning restrictor generally designated 38. Each of these restrictors is secured to and coextensive with the opposing sides of said adjacent modules 26 and between the external star-point 36 and the exterior of said charge. The apexes 41 of said restrictors 38 are contiguous with the exterior surface of said charge generally designated 39. The charge has an internal burning surface, generally designated 42, extending from said internal star-point 27 to said external star-point 36. Bonding or adhesive material, hereinafter designated bonding mortar, bonds contiguous surfaces of the submodules in such a manner that each of the submodules (such as 28, 29, and 31) are bonded to each other in the same module (such as 26) and the sides of each module are bonded to the sides of the adjacent burning restrictors. Referring to the embodiment shown in FIGURE 4, wherein like reference numerals have been used to designate like parts, each module is composed of two types of submodules 28, 31 with submodule 28 being hipped at points 38, as more clearly shown in FIGURE 5. Referring to another embodiment shown in FIGURE 6, burning restrictors, generally designated 38, are bonded to the sides of module 26.

Figure 7:
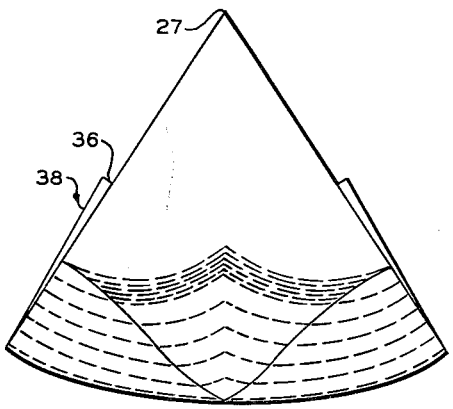
FIGURE 7 is an elevational view of one module similar to FIGURE 6 with a flame propagation diagram imposed thereon.

FIGURE 7 is a cross-sectional view of a module with a flame propagation diagram imposed thereon. It demonstrates, by geometrical solution, the theory for constructing submodules in a manner proposed to achieve sliverless burning. Whether the module is made up of a propellant with two or three burning rates, the construction principle is analogous. The shapes of the modular interfaces result from defining the interface as a locus of points described by the intersection (2) or (3) families of circles. One family is concentric with the center line of the motor or the internal star-point and the other family is concentric with the end of the restrictor or external star-point, or wherever that particular module will be first ignited. The radial increments of these families of concentric circles are proportional to the burning rates of the respective submodules.

Figure 8:
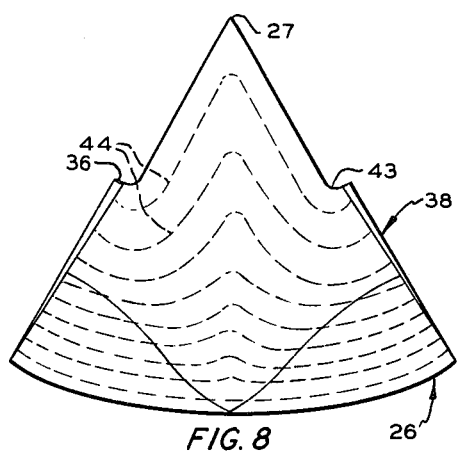
FIGURE 8 is an elevational view of a module of another embodiment of this invention with progressive burning rate curves imposed thereon.

FIGURE 8 is a module with progressive burning rate curves 44 imposed thereon to demonstrate how essentially sliverless burning will be achieved. Each internal side of the module 26 being rabbeted out in generally triangular shape with its base 43 on the same line as the base of restrictors 38, a device to increase free volume within the chamber.

Figure 9:
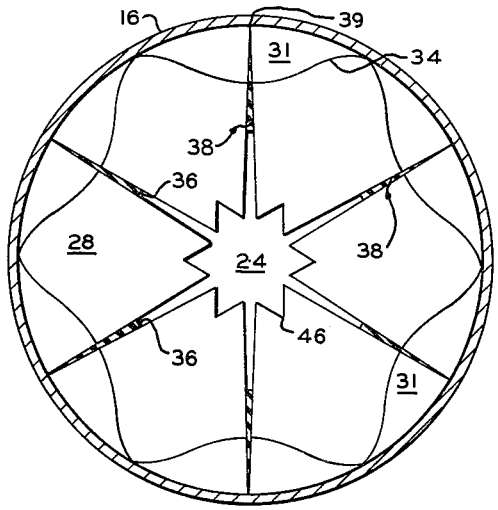
FIGURE 9 is a cross-sectional view of still another embodiment of the rocket motor charge of this invention.

Referring to FIGURE 9, which is still another embodiment of the rocket motor charge of this invention, each of the internal star-points are cut in the shape of a triangular notch 46, which is a device to increase the free volume within the chamber, so that the area of the port (or cross-sectional area of the free volume), is sufficiently larger than the nozzle throat area so as not to introduce errosive burning. This notching out has no effect on performance.

Figure 10:
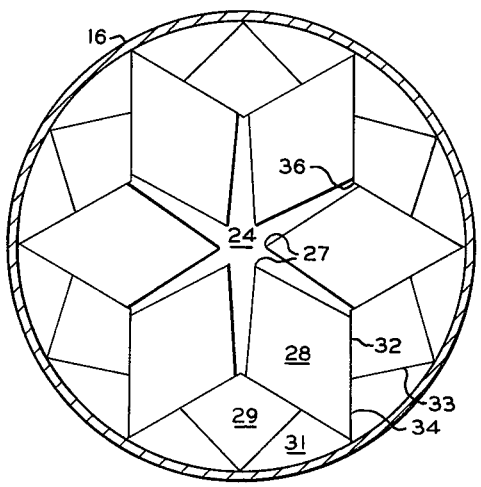
FIGURE 10 is a cross-sectional view illustrating a further embodiment of the invention without burning restrictors.

Referring now to the embodiment shown in FIGURE 10, which illustrates a still further embodiment of the invention not employing burning restrictors. This modular design can also be used to achieve substantially sliverless burning by the indicated arrangement of the submodules 28, 29, and 31.

Referring again to FIGURE 1, a method of loading the charge into a jet propelled device of the sustained type rocket motor will be described. A solid propellant material is compounded by mixing an inorganic oxidizing salt and a rubbery copolymer of a vinyl pyridine and a conjugated diene having 4 to 6 carbon atoms per molecule. Selected amounts of a burnnig rate catalyst and various other compounding ingredients are blended into the mixture at this time so as to give the prescribed burning rate. The resulting material is heated to effect curing of the same. Desired lengths of this cured solid propellant material are extruded in certain critical shapes which are termed submodules. These submodules are assembled in the shape of a generally sectorial wedge to form, what is termed in the art, a propellant module, the submodules being bonded together along their sides with a suitable bonding mortar. The assembled modules are arranged around the inner surface of the casing of the rocket motor in such a manner that their initial internal exposed surface defines an axial star-shaped perforation. These modules are bonded with a similar bonding material to the inner wall of the motor casing.

If burning restrictors are to be inserted between the fixed modules, a further step is necessary. The internal surface defined by the bonded modules are lined with a sheet of SBR rubber. The sheet is bonded to the inner wall of the casing at the external star points. An epoxy resin is cast between the modules up to the desired height of restriction of burning.

Referring to the charge configuration of FIGURE 10 a slightly modified procedure is followed in arranging the submodules. The first and outermost type of submodules is arranged contiguously around the inner wall of the motor and bonded thereto. The second layer of submodules is placed between the contiguous first submodules and bonded thereto. The third and innermost layer of submodules is fitted into the triangular notch defined by the bonded first and second submodules in such a manner that the initial internal exposed surface of the charge defines an axial star-shaped perforation. The third submodules are also bonded in place.

When the charge of any of the embodiments described in this invention are in place, the restrictor plate, the closure member, the igniter means, and the ignition wires are installed in their proper position in a manner well known in the art.

In operation, the ignition of the propellant charge 12 of FIGURE 1 is initiated by igniter 22. The resulting flame and combustion gases from this igniter propagate through the length of the axial star-shaped perforation 24 in a well-known manner, and across the inner surface 42 of the propellant charge 12, defined by an internal burning surface extending from said internal starpoints 27 to said external star-points 36, burning of the propellant charge then proceeds progressively outward from this inner surface.

The burning rate of the propellant mass can be made variable by incorporating variable amounts of burning rate catalysts in each of the submodules of each module and/or by varying the particle size of oxidizer used in fabricating the submodules of the charge. In the embodiments shown in FIGURES 2, 4, 9 and 10, it is desired to have substantially complete elimination of slivers as the burning surface approaches the exterior of the charge. This is accomplished by fabricating submodules of variable burning rates with the fastest burning rate being from 10 to 50 percent higher than the slowest burning rate of said submodules.

Although I have described and illustrated a rocket motor charge composed of two and three variable burning rate submodules in each module, it is within the scope of this invention to provide a rocket motor utilizing a plurality of submodule propellant charges. In addition, I do not intend to limit the propellant charge configuration to that described or illustrated in detail herein and those skilled in the art will recognize configurations other than cylindrical that can be adapted according to the operational requirements to be met, without departing from the scope of my invention. Moreover, while I prefer to utilize the composite charge of my invention in the rocket motor of a projectile so as to propel the same, I do not intend to so limit my invention and it must be understood that the composite propellant charge can be employed for energizing gas pressure systems for the actuation of an apparatus of various types, etc.

The propellant material utilized in fabricating the rocket modules of this invention can be prepared from a variety of known compounding materials. Particularly useful propellant compositions which may be utilized in the practice of this invention are of the rubbery copolymer-oxidizer composite type which are plasticized and worked to prepare an extrudable mass. The copolymer can be reinforced with suitable agents such as carbon black, silica, and the like. Suitable oxidation inhibitors, wetting agents, modifiers, vulcanizing agents, and accelerators can be added to aid processing and to provide for the curing of the extruder propellant grains at temperatures preferably in the range of 170–185° F. In addition to the copolymer binder and other ingredients, the propellant composition comprises an oxidizer and a burning rate catalyst.

Solid composite-type propellant compositions particularly useful in the preparation of the propellants used in this invention are prepared by mixing the copolymer with a solid oxidizer, a burning rate catalyst, and various other compounding ingredients so that the reinforced binder forms a continuous phase and the oxidizer a discontinuous phase. The burning rate catalyst is varied in each type of composition prepared so as to give propellant material varying burning rates in the range previously indicated. The resulting mixture is heated to effect curing of the same.

The copolymers are preferably formed by copolymerization of a vinylheterocyclic nitrogen compound with an open-chain conjugated diene. The conjugated dienes employed are those containing 4 to 6 carbon atoms per molecule and representatively include 1,3-butadiene, isoprene, 2,3-dimethyl-1,3-butadiene, and the like. The vinylheterocyclic nitrogen compound generally preferred is a monovinylpyridine or alkyl-substituted monovinylpyridine such as 2-vinylpyridine, 3-vinylpyridine, 4-vinylpyridine, 2-methyl-5-vinylpyridine, 5-ethyl - 2-vinylpyridine, 2,4-dimethyl-6-vinylpyridine, and the like. The corresponding compounds in which an alpha-methylvinyl (isopropenyl) group replaces the vinyl group are also applicable.

In the preparation of the copolymers, the amount of conjugated dienes employed is in the range between 75 and 95 parts by weight per 100 parts monomers and the vinylheterocyclic nitrogen is in the range between 25 and 5 parts. Terpolymers are applicable as well as copolymers and the preparation of the former up to 50 percent of the conjugated diene can be replaced with another polymerizable compound such as styrene, acrylonitrile, and the like. Instead of employing a single conjugated diene compound, a mixture of conjugated dienes can be employed. The preferred, readily available, binder employed is a copolymer prepared from 90 parts by weight of butadiene and 20 parts by weight of 2-methyl-5-vinylpyridine, hereinafter abbreviated Bd/MVP. This copolymer is polymerized to a Mooney (ML–4) plasticity value in the range of 10–40, preferably in the range of 15–25, and may be masterbatched with 5–20 parts of Philblack A, furnace black, per 100 parts of rubber. Masterbatching refers to the method of adding carbon black to the latex before coagulation and coagulating to form a high degree of dispersion of the carbon black and the rubber. In order to facilitate dispersion of the carbon black in the latex, Marasperse-CB, or similar surface activation, is added to the carbon black slurry or to the water used to prepare the slurry.

The oxidizer which can be employed in preparing the propellant composition is preferably of the alkali metal and ammonium salts of perchloric, chloric, and nitric acids.

The following empirical formulation or recipe generally represents the class of propellant compositions preferred for the preparation of the propellant charge of this invention.

*Table I*

| Ingredient | Parts per 100 parts of rubber | Parts by Weight |
|---|---|---|
| Binder | | 10–25 |
| Copolymer Bd/MVP | 100 | |
| Philblack A (a furnace black) | 10–30 | |
| Plasticizer | 10–30 | |
| Silica | 0–20 | |
| Metal oxide | 0–5 | |
| Antioxidant | 0–5 | |
| Wetting agent | 0–2 | |
| Accelerator | 0–2 | |
| Sulfur | 0–2 | |
| Oxidizer (Ammonium nitrate) | | 75–90 |
| Burning rate catalyst | | 0–30 |

Suitable plasticizers useful in preparing these propellant charges include TP–90–B (dibutoxyethoxyethyl formal supplied by Thiokol Corporation); benzophenone; and Pentaryl A (monoamylbiphenyl). Suitable silica preparations include a 10–20 micron size range supplied by Davison Chemical Company; and Hi-Sil 202, a rubber grade material supplied by Columbia-Southern Chemical Corporation. A suitable antioxidant is Flexamine, a physical mixture containing 25 percent of a complex diaryl-aminoketone reaction product and 35 percent of N,N'-diphenyl-p-phenylenediamine, supplied by Naugatuck Chemical Corporation. A suitable wetting agent is Aerosol-OT (dioctyl sodium sulfosuccinate, supplied by American Cyanamid Company). Satisfactory rubber cure accelerators include Philcure 113 (SA–113 N,N-dimethyl-S-tertiary butylsulfenyl dithiocarbamate); Butyl–8 (a dithiocarbamate-type rubber accelerator supplied by R. T. Vanderbilt Company); and GMF (quinone dioxime, supplied by Naugatuck Chemical Company). Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamberg blue, laundry blue, washing blue, Williamson blue, and the like. Other burning rate catalysts such as ammonium dichromate, potassium dichromate, sodium dichromate, ammonium molybdate, and the like, can also be used.

The bonding mortar utilized for bonding the individual submodules of propellant to each other and to the rocket motor casing should preferably have a burning rate which is approximately the same as the average burning rate of the composite propellant charge, or for a more refined charge, the burning rate of the mortar can be adapted to the average of the rates of the contiguous submodules of the propellant. Any known bonding material, such as a rubber base cement, can be used for bonding the submodules of propellant. The bonding agent or mortar, however, preferably comprises a compatible rubbery binder, preferably liquid in its uncured state and having incorporated therein a low oxidizer content. A series of particularly useful polysulfide liquid polymer formulations which can be employed as binders in the mortar are those such as LP–2, LP–3 and LP–8, prepared by the Thiokol Corporation. When these polymers have incorporated therein ammonium perchlorate, which contains a higher percentage of oxygen than ammonium nitrate, low oxidizer loadings must be utilized to limit burning rate to the desirable range of 0.1 to 0.2 inch per second. These formulations are characterized by their high resiliency due to the nature of the binder and to their relatively low oxidizer content, thereby when blocks of propellant are bonded with mortar made from these formulations, they are less susceptible to the effects of shock at temperature induced forces. The bonding material can be cured along the assembled blocks of propellant. A recipe for suitable propellant mortar formulations for the preparation of resilient mortars having burning rates in the range of 0.1 to 0.2 inch per second is given in the following example.

Table II

| Ingredient: | Weight percent |
|---|---|
| Ammonium perchlorate | 40–60 |
| LP–3 [1] | 35–55 |
| p-quinone dioxime | 0–5 |
| Diphenyl quanidine | 0–3 |

[1] A liquid polymer prepared by the Thiokol Corporation.

While I have described and illustrated my invention in its preferred embodiment, I do not wish to unnecessarily limit it thereto and various modifications of this invention will become apparent to those skilled in the art without departing from the scope or spirit of our invention.

We claim:

1. In a rocket motor, a solid cylindrical charge of propellants, said charge having an axial star-shaped perforation providing said charge with a plurality of internal and external star points, said charge comprising a plurality of longitudinally extending, circumferentially contiguous propellant modules, each forming a substantially sectorial wedge of said charge disposed with the apexes of said wedges forming the internal star points of said charge, said charge having an internal burning surface extending from said internal to said external star points, each of said modules comprising at least a first and a second contiguous submodule, similarly longitudinally extending, the interface between said contiguous submodules being defined by the locus of points described by the intersections of at least two families of concentric circles, the center of the first of said families being located generally at the internal star point of said charge at the apex of said first submodules, the center of the second family being located generally at the external star point of said charge, the radial increments of said first and second families of concentric circles being proportional to the burning rates of said first and second submodules, respectively, whereby said charge will burn out without leaving any substantial slivers.

2. In a rocket motor, a solid cylindrical charge of propellants, said charge having an axial star-shaped perforation providing said charge with a plurality of internal and external star points, said charge comprising a plurality of longitudinally extending, circumferentially contiguous, propellant modules each forming a substantially sectorial wedge of said charge disposed with the apexes of said wedges forming the internal star points of said charge, said charge having an internal burning surface, extending from said internal to said external star points, each of said modules comprising at least a first and a second contiguous submodule, similarly longitudinally extending, the interface between said contiguous submodules being defined by the locus of points described by the intersections of at least two families of concentric circles, the center of the first of said families being located generally at the internal star point of said charge at the apex of said first submodule, the center of the second family being located generally at the external star point of said charge, the radial increments of said first and second families of concentric circles being proportional to the burning rates of said first and second submodules, respectively, with the fastest burning rate being from 10 to 50 percent higher than the slowest burning rate, whereby said charge will burn out without leaving any substantial slivers.

3. In a rocket motor, a solid cylindrical charge of propellants, said charge having an axial star-shaped perforation providing said charge with a plurality of internal and external star points, said charge comprising a plurality of longitudinally extending, circumferentially contiguous propellant modules, each forming a substantially sectorial wedge of said charge disposed with the apexes of said wedges forming the internal star points of said charge, and charge having an internal burning surface extending from said internal to said external star points, each of said modules comprising at least a first, second and third contiguous submodule, similarly longitudinally extending, the interface between said submodules being defined by the locus of points described by the intersections of at least three families of concentric circles, the center of the first of said families being located generally at the internal star point of said charge at the apex of said first submodule, the center of the second of said families being located generally at the external star point of said charge, the center of the third of said families being located generally at the point where the last module is first ignited, the radial increments of said first, second and third families of concentric circles being proportional to the burning rates of said first, second, and third submodules, respectively, whereby said charge will burn out without leaving any substantial slivers.

4. In a rocket motor, a solid cylindrical charge of propellants, said charge having an axial star-shaped perforation providing said charge with a plurality of internal and external star points, said charge comprising a plurality of longitudinally extending, circumferentially contiguous propellant modules, each forming a substantially sectorial wedge of said charge disposed with the apexes of said wedges forming the internal star points of said charge, said charge having an internal burning surface extending from said internal to said external star points, each of said modules comprising at least a first, second and third contiguous submodule, similarly longitudinally extending, the interface between said submodules being defined by the locus of points described by the intersections of at least three families of concentric circles, the center of the first of said families being located generally at the internal star point of said charge at the apex of said first submodule, the center of the second of said families being located generally at the external star point of said charge, the center of the third of said families being located generally at the point where the last module is first ignited, the radial increments of said first, second and third families of concentric circles being proportional to the burning rates of said first, second, and third submodules, respectively, with the fastest burning rate being from 10 to 50 percent higher than the slowest burning rate of said three submodules, whereby said charge will burn out without leaving any substantial slivers.

5. In a rocket motor, a solid cylindrical charge of propellants, said charge having an axial star-shaped perforation providing said charge with a plurality of internal and external star points, said charge comprising a plurality of longitudinally extending, circumferentially contiguous propellant modules, each forming a substantially sectorial wedge of said charge disposed with the apexes of said wedges forming the internal star points of said charge, a wedge shaped burning restrictor disposed between each pair of adjacent modules, each of said restrictors being secured to and coextensive with the opposing sides of said adjacent modules and between the external star points and the exterior of said charge, with the apexes of said restrictors contiguous with the exterior of said charge, said charge having an internal burning surface extending from said internal to said external star points, each of said modules comprising at least a first and a second contiguous submodule, similarly longitudinally extending, the interface between said contiguous submodules being defined by the locus of points described by the intersections of at least two families of concentric circles, the center of the first of said families being located generally at the internal star point of said charge at the apex of said first submodules, the center of the second family being located generally at the external star point of said charge, the radial increments of said first and second families of concentric circles being proportional to the burning rates of said first and second submodules, respectively, whereby said charge will burn out without leaving any substantial slivers.

6. In a rocket motor, a solid cylindrical charge of propellants, said charge having an axial star-shaped perforation providing said charge with a plurality of internal and external star points, said charge comprising a plurality of longitudinally extending, circumferentially contiguous propellant modules, each forming a substantially sectorial wedge of said charge disposed with the apexes of said wedges forming the internal star points of said charge, a wedge shaped burning restrictor disposed between each pair of adjacent modules, each of said restrictors being secured to and coextensive with, the opposing sides of said adjacent modules and between the external star points of said charge and the exterior of said charge, with the apexes of said restrictors contiguous with the exterior of said charge, said charge having an internal burning surface extending from said internal to said external star points, each of said modules comprising at least a first, second and third contiguous submodule, similarly longitudinally extending, the interface between said submodules being defined by the locus of points described by the intersections of at least three families of concentric circles, the center of the first of said families being located generally at the internal star point of said charge at the apex of said first submodule, the center of the second of said families being located generally at the external star point of said charge, the center of the third of said families being located generally at the point where the last module is first ignited, the radial increments of said first, second and third families of concentric circles being proportional to the burning rates of said first, second, and third submodules, respectively, whereby said charge will burn out without leaving any substantial slivers.

7. A solid propellant module for a rocket motor charge, said module being generally wedgelike in form and having a cross section generally sectorial in shape comprising, in combination, at least three submodules having cross sections diamond, triangular, and generally triangular in shape, said submodules extending longitudinally within said module, bonded together at their sides, each of said submodules comprising a mixture of an inorganic oxidizing salt and a rubbery copolymer and submodules varying in composition whereby different burning rates are achieved, the fastest burning rate being from 10 to 50 percent higher than the slowest burning rate.

8. A solid propellant module for a rocket motor charge, said module being generally wedgelike in form and having a cross section generally sectorial in shape comprising, in combination, at least two submodules having cross sections diamond and generaly triangular in shape, said submodules extending longitudinally within said module, bonded together at their sides, each of said submodules comprising a mixture of an inorganic oxidizing salt and a rubbery copolymer, said submodules varying in composition whereby different burning rates are achieved, the fastest burning rate being from 10 to 50 percent higher than the slowest burning rate.

9. A solid propellant module for a rocket motor charge, said module being generally wedgelike in form and having a cross section generally sectorial in shape, each of said internal star points formed by said modules being rabbeted in, generally in the shape of a triangle, on both sides of said internal star point thereby increasing the free volume within said charge whereby erosive burning in the nozzle throat area is substantially eliminated, comprising, in combination, at least two submodules having cross sections diamond and generally triangular in shape, said submodules extending longitudinally within said module, bonded together at their sides, each of said submodules comprising a mixture of an inorganic oxidizing salt and a rubbery copolymer, said submodules varying in composition whereby different burning rates are achieved, the fastest burning rate being from 10 to 50 percent higher than the slowest burning rate.

10. In a rocket motor, a solid cylindrical charge of propellants, said charge having an axial star-shaped perforation providing said charge with a plurality of internal and external star points, said charge comprising a plurality of longitudinally extending, circumferentially contiguous propellant modules, each forming a substantially sectorial wedge of said charge disposed with the apexes of said wedges forming the internal star points of said charge, each of said internal star points being cut in, in the shape of a triangular notch thereby increasing the free volume within said charge whereby erosive burning in the nozzle throat area is substantially eliminated, a wedge shaped burning restrictor disposed between each pair of adjacent modules, each of said restrictors being secured to and coextensive with the opposing sides of said adjacent modules and between the external star points of said charge and the exterior of said charge, with the apexes of said restrictors contiguous with the exterior of said charge, said charge having an internal burning surface extending from said internal to said external star points, each of said modules comprising at least a first and a second contiguous submodule, similarly longitudinally extending, the interface between said contingous submodules being defined by the locus of points described by the intersections of at least two families of concentric circles, the center of the first of said families being located generally at the internal star point of said charge at the apex of said first submodules, the center of the second family being located generally at the external star point of said charge, the radial increments of said first and second families of concentric circles being proportional to the burning rates of said first and second submodules, respectively, whereby said charge will burn out without leaving any substantial slivers.

References Cited in the file of this patent

UNITED STATES PATENTS

| | | |
|---|---|---|
| 766,455 | Maxim | Aug. 4, 1904 |
| 2,195,429 | Shaler | Apr. 2, 1940 |
| 2,418,333 | Caldwell et al. | Apr. 1, 1947 |
| 2,600,678 | O'Neill | June 17, 1952 |
| 2,628,561 | Sage et al. | Feb. 17, 1953 |
| 2,762,193 | Johnson | Sept. 11, 1956 |
| 2,939,275 | Loedding | June 7, 1960 |